Figure 1:
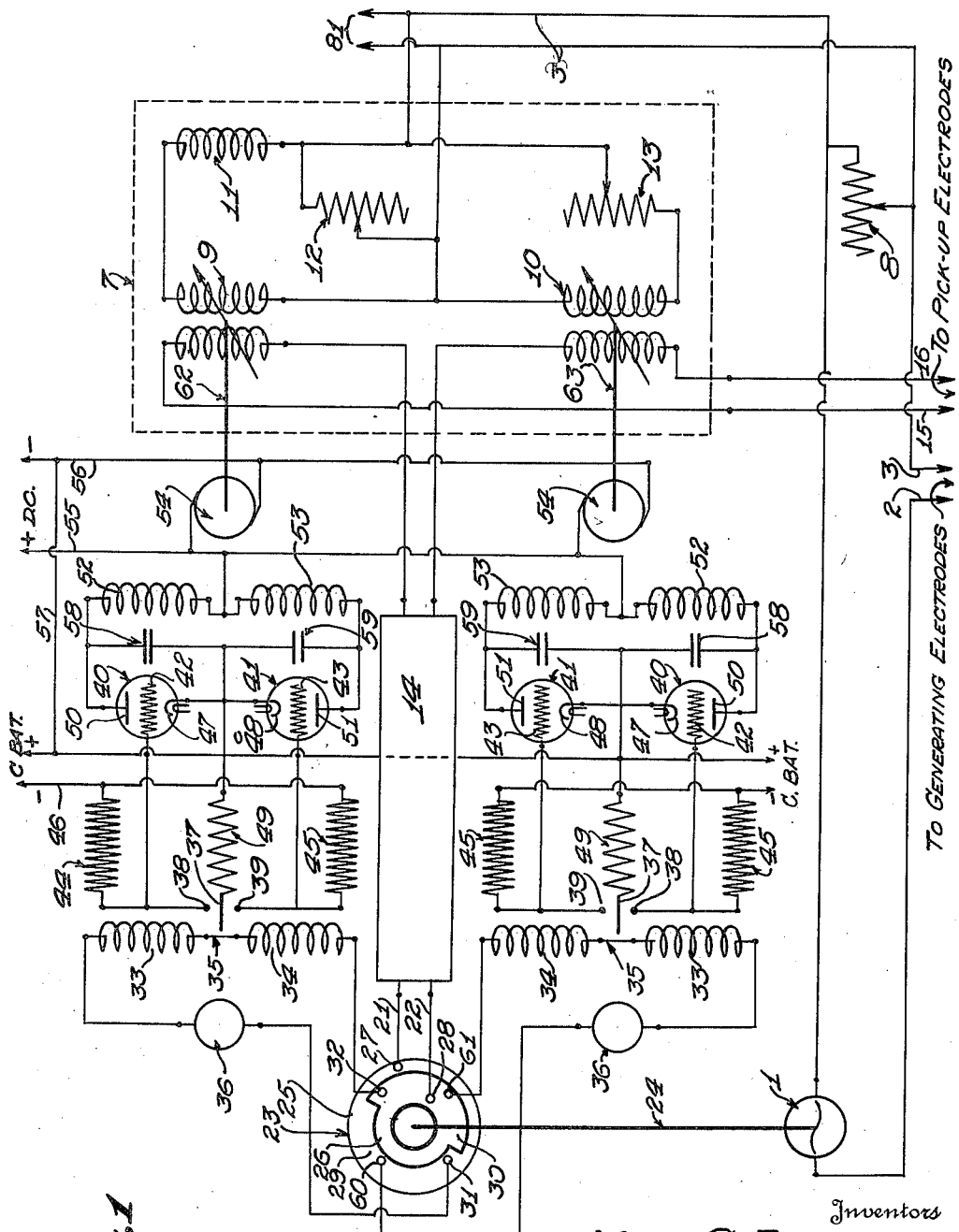

Jan. 3, 1939. M. C. BOWSKY ET AL 2,142,555
AUTOMATIC COMPENSATOR FOR GEOPHYSICAL DEVICES
Filed Jan. 13, 1936   2 Sheets-Sheet 1

Inventors
MERLE C. BOWSKY
ARTHUR B. WINTER
By Lloyd Spencer
Attorney

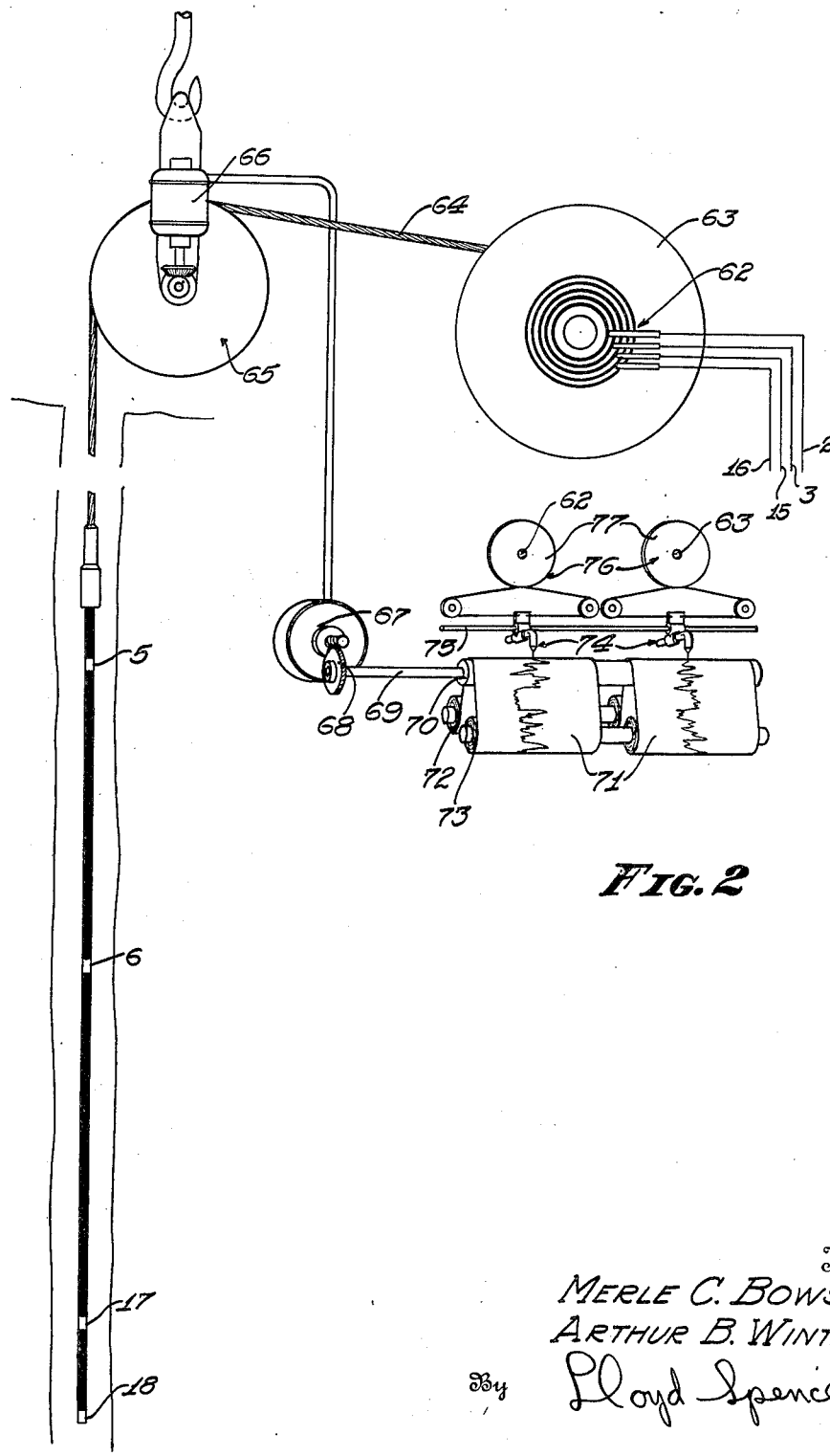

Patented Jan. 3, 1939

2,142,555

UNITED STATES PATENT OFFICE 2,142,555

AUTOMATIC COMPENSATOR FOR GEOPHYSICAL DEVICES

Merle C. Bowsky and Arthur B. Winter, Los Angeles, Calif., assignor, by mesne assignments, to Lane-Wells Company, Los Angeles, Calif., a corporation of Delaware Application January 13, 1936, Serial No. 58,864

16 Claims. (Cl. 175—182)

Our invention relates to automatic compensators for geophysical devices, and the objects of our invention are:

First, to provide an automatic compensator which is designed for use in conjunction with geophysical devices, particularly any geophysical device which employs an electric field generating means and pick-up means for measuring the effect of this field at different points to obtain an electrical profile.

Second, to provide an automatic compensator of this type which may be associated with different types of geophysical devices whether relating to surface prospecting apparatus or to the determination of formation adjacent a well bore, or whether such geophysical devices utilize direct or alternating current or rely on variations in ohmic resistance or phase displacement and amplitude.

Third, to provide an automatic compensator for geophysical devices which eliminates the human error formerly inherent in translating the electrical fluctuations obtained with geophysical devices into a graphic record.

Fourth, to provide an automatic compensator which materially reduces the skill and training, as well as the constant acute attention formerly required of a person operating electrical geophysical devices, whereby a relatively inexperienced person may be employed for this purpose.

Fifth, to provide an automatic compensator of this character which eliminates the laborious and time-consuming methods formerly required in order to arrange the data obtained by the geophyical devices into a chart capable of interpretation.

Sixth, to provide a geophysical device of this character wherein the electric profile obtained with the pick-up elements of a geophysical device is continuously and automatically recorded in graphic form and ready for immediate interpretation.

Seventh, to provide an automatic compensator of this character wherein the graph or chart produced thereby reports with high fidelity the electrical profile obtained by the pick-up element of the associated geophysical device.

Eighth, to provide an automatic compensator of this character which, by reason of its continuous recording feature, is particularly useful in conjunction with "electrical coring" apparatus, that is, geophysical devices which are lowered into well bores for determining the character of the surrounding formation, for the cable-carrying electrodes or analogous elements constituting the pick-up means of the geophysical device may be withdrawn without pause from the well, with the result that the record is complete and immediately ready for interpretation by the time the cable is withdrawn.

Ninth, to provide an automatic compensator of this class whereby any number of pick-up elements may be incorporated in the geophysical device so as to obtain data simultaneously at different points with respect to the generating elements of the device; in such case, it merely being necessary to duplicate the automatic compensator.

With these and other objects in view as will appear hereinafter, reference is made to the accompanying drawings in which, Fig. 1 is a wiring diagram illustrating the application of our automatic compensator to the compensating circuit of an "electrical coring" apparatus operated within well bores.

Fig. 2 is a substantially diagrammatical view illustrating a cable drum and measuring sheave which carries a cable adapted to be lowered into a well bore and provided with the electrodes of the "electrical coring" apparatus, and showing the manner in which movement obtained with the automatic compensator may be translated into a graph or chart.

For purposes of illustration, our automatic compensator is shown in conjunction with an "electrical coring" apparatus, which apparatus utilizes variation in phase displacement and amplitude for locating and identifying the formation along the well bore. However it should be borne in mind that practically all the electrical geophysical devices which generate an electric field and measure formations of this field at various points employ a compensator circuit in which our automatic compensator may be incorporated. The particular "electric coring" apparatus here disclosed in conjunction with our automatic compensator is particularly set forth in Patent No. 1,996,530, issued April 2, 1935, to K. Sundberg et al.

This apparatus employs an alternating current generator 1 from which alternating current is conducted through two insulated conductors 2 and 3 to two electrodes 5 and 6 suspended at different depths in a water-filled drill hole 4. A portion of the current is allowed to flow through an alternating current potentiometer 7, which is connected in parallel to an adjustable shunt resistance 8 so that any desired portion of the current in the conductor 3 may be caused to flow through the alternating current potentiometer 7. The potentiometer provides means for supplying the opposing voltage to balance the potential between the auxiliary pick-up electrodes hereinafter referred to. In the constructional form illustrated in the drawings, said alternating current potentiometer 7 consists of two parallel circuits containing variocouplers 9 and 10, respectively.

In one of said circuits, an inductive resistance 11 is connected in series with the primary coil of the variocoupler 9, and a variable resistance 12 is connected in parallel with the same primary coil. In the other circuit a variable resistance 13 is connected in series with the primary coil of the variocoupler 10. By suitably selecting the inductive resistance 11 relative to the self-induction of the primary coils of the two variocouplers, and by adjustment of the resistances 12 and 13, the current through the potentiometer may easily be equally divided in the two primary coils, and simultaneously, the current in the one primary coil may be given a phase displacement, for instance, of 90°, relative to the current in the other primary coil.

The secondary coils of the two variocouplers 9 and 10 are connected with an amplifier 14 which, in turn, is connected with the automatic compensator circuits to be described hereinafter. Said secondaries of the variocouplers 9 and 10 are likewise connected through insulated conductors 15 and 16 with two pick-up electrodes 17 and 18 in such a manner that the secondary coils of the variocouplers are in series between the amplifier 14 and electrodes 17 and 18 respectively. The pick-up electrodes 17 and 18 are suspended in the drill hole 4. With the two secondary coils connected in this manner, it is possible to obtain in the secondary circuit which comprises the amplifier 14 and automatic compensator hereinafter described, together with conductor 15, pick-up electrodes 17 and 18, and conductor 16, an alternating current potential phase amplitude which is used for balancing the potential between the two electrodes 17 and 18 set up by the alternating field generated in the drill hole by the main electrodes 5 and 6.

*Automatic compensator circuits*

Two leads 21 and 22 extend from the amplifier 14 and correspond to the secondaries of the variocouplers 9 and 10. These leads, of course, carry alternating current and by reason of the amplification, their respective phases are shifted from the 90° relationship. This is corrected as will be brought out hereinafter.

A rotary converter 23 is mounted on a shaft 24 driven by the alternating current to motor 1. The rotary converter is provided with two circular tracks 25 and 26 upon which ride terminals 27 and 28 of the leads 21 and 22 respectively. In addition, and electrically associated with each track, there is a semi-circular track arranged concentrically (or in a common plane, depending upon whether the converter is of the disc or drum type). A pair of brushes 31 and 32 is diametrically disposed upon the rotary converter so as to ride on the semi-circular tracks 29 and 30. These electrodes are connected in series with a pair of movable coils 33 and 34 of a double-pole galvanometer relay 35. A microammeter 36 is in series with the movable coils of the relay 35.

The movable coils 33 and 34 actuate a contact arm 37 which is engageable with contacts 38 and 39 in such a manner that when the microammeter 36 reads negative, contact 38 is engaged; and when it reads positive, contact 39 is engaged.

The galvanometer relay controls two gas-triode electronic valves 40 and 41. The grids 42 and 43 of these valves are connected with contacts 38 and 39 respectively, and are also connected through resistors 44 and 45 respectively to a negative lead 46 from a C battery, not shown. The filaments 47 and 48, which may be either directly or indirectly heated, are connected together and to the contact arm 37 of the galvanometer relay 35, preferably through a resistor 49 so that the current to which the contacts are subjected does not exceed the permissible load on these contacts.

The plates 50 and 51 of the valves 40 and 41, respectively, are connected in series with a pair of field coils 52 and 53 which constitute the field coils of a split-field direct current electric motor 54. The armature of the motor 54 is connected to leads 55 and 56 from a direct current source, not shown. The negative lead 56 from such source is connected by a lead 57 to the positive lead from the C battery terminal, which terminal is connected with the filaments or cathodes 47 and 48 of the valves 40 and 41. Condensors 58 and 59 are connected between the plates 50 and 51 and the cathodes 47 and 48 of the valves 40 and 41, respectively, so that when the grid voltage is lost, the corresponding condensor reduces the plate voltage below the ionization potential of the gas in the tube; it being noted that condensors are charged through the coils 52 and 53 which function as current limiting devices.

The rotary converter 23 is also engaged by brushes 60 and 61 which ride in the semi-circular tracks 29 and 30, and are disposed diametrically with respect to each other and at right angles to brushes 31 and 32. The brushes 60 and 61 are connected with a second galvanometer relay 35 and associated circuit for controlling a second motor 54, which is identical to the hereinbefore described circuit embraced by the reference characters 35 to 59.

The rotary converter 23 is positioned within the electro-magnetic field of the motor 1 so that regardless of the phase relationship between leads 21 and 22, the circuit controlled by brushes 31 and 32 occupies the phase relationship with respect to the circuit controlled by brushes 60 and 61 determined by mechanical relationship of these two sets of brushes; in this case, 90°. The two motors 54 are connected with the variocouplers 9 and 10 through shafts 62 and 63, there being suitable gear reduction means, not shown, interposed between the motors 54 and their respective shafts.

The conductors 2, 3, 15 and 16 are connected through suitable commutator means 621 associated with a hoisting sheave 631 around which is wound a hoisting cable 64 in which continuations of the conductors 2, 3, 15, and 16 are encased. The cable 64 passes over a measuring sheave 65 which is suspended over the well bore and which drives a Selsyn motor 66. The Selsyn motor 66 is suitably connected to a companion Selsyn motor 67 which, through gear reduction means 68, drives a shaft 69. The shaft 69 carries one or more driving drums 70 over which pass a pair of ribbon charts 71 which unwind from spools 72 and wind upon spools 73. The ribbon charts 71 are engageable by styluses 74 suitably guided on a rod 75. The styluses are adapted to be moved back and forth across their respective ribbon charts by any suitable means, such as by cable drives 76 which include driving wheels 77. The two wheels 77 are mounted on, or are driven by, the shafts 62 and 63 respectively, which are connected to the variocouplers 9 and 10 respectively.

Operation

In practice the distance between the two auxiliary pick-up electrodes 17 and 18 should be chosen so small that the potential drop between said electrodes divided by the distance between the same may be deemed to be equal to the electric field in the space between said electrodes. The distance from the pair of electrodes 17 and 18 to the nearest current-carrying main electrode 6, on the other hand, should be at least fifty times the diameter of the drill hole, whereby the advantage is gained in that the measuring results are not appreciably influenced by the electric conductivity of the liquid with which the drill hole is filled. The distance between the two current-carrying main electrodes 5 and 6 should be still considerably larger than the last mentioned distance. In certain cases, it may be suitable to place the upper current-carrying electrode 5 in a fixed position in the upper portion of the drill hole, while the other three electrodes 6, 17, and 18 are moved in unison to the various parts of the drill hole which are to be investigated.

While the cable 64 and the electrodes 5, 6, 17, and 18, or alternatively, only electrodes 6, 17, and 18, are lowered or raised in the drill hole, the variocouplers 9 and 10 must be turned first one way then the other to maintain the microammeter 36 at zero. This is accomplished automatically for, considering the circuit associated with variocoupler 9, when the microammeter registers zero or practically zero, neither contact 38 or 39 is engaged by the arm 37; consequently, the C battery maintains a strong negative bias in the grids 42 and 43 and prevents current flow from the cathodes 47 and 48 to plates 50 and 51 with the result that neither field coil 52 or 53 of the motor 54 is excited. When, however, the microammeter indicates a negative voltage, the arm 37 engages contact 38 causing grid 42 to lose its negative bias and permitting current to flow through tube 40 which excites field coil 52 and turns the motor 54 in a direction to turn the variocoupler 9 until the microammeter 36 again reads zero. Should the microammeter read positive, current is permitted to flow through tube 41 and excite field 53; thereby causing reverse movement of the motor and, consequently, reverse movement of the variocoupler 9. Very little current need flow through the movable arm 37 to either contact 38 or 39 in order to effect this operation; therefore, a sensitive galvanometer relay may be used requiring very slight potential in either direction to close either of its circuits.

Energizing of the field coils 52 and 53 is instantaneously effected by variations in the potential at the microammeter 36 so that the variocouplers 9 and 10 tend to correct for variations or fluctuations in the field to be measured even though these changes take place rapidly. By reason of the connection between the styluses 74 and the shafts 62 and 63, the movement of the variocouplers is immediately recorded. Thus, all hand operation of the variocouplers and attendant skill on the part of the operator is eliminated; also the cable may be lowered or raised continuously with comparative rapidity, there being no need to stop in order to obtain the reading of the variocouplers at different points and then later plotting the results of these readings in order to form a chart.

It is often desirable to use more than one set of pick-up electrodes. Heretofore, to do this required an extra operator, but with our automatic compensator, it is merely necessary to extend leads 81 from the two parts of lead 3, shown to the right of Fig. 1, and connect an additional alternating current potentiometer 7 and the control circuit hereinbefore described.

Though we have shown and described certain embodiments of our invention, we do not wish to be limited thereto but desire to include in the scope of our invention the constructions, combinations, and arrangements substantially as set forth in the appended claims.

We claim:

1. The combination with means for generating an alternating electric field in a drill hole containing an electrically conductive liquid, means for indicating fluctuations in the relative value of the phase and amplitude of said field at different points in said hole, and a reversible motor controlling the last-mentioned means, of a motor control comprising: a pair of operating circuits adapted when closed to drive the motor in opposite directions; an electronic valve in each operating circuit; and a dual control circuit incorporating said electronic valve and normally maintaining a bias thereon whereby both of said operting circuits are held open, said control circuit incorporating means arranged to be actuated by fluctuations in said indicating means for removing the bias on either of said electronic valves and closing the corresponding operating circuit.

2. The combination in an automatic compensator for a geophysical device, of a potentiometer comprising a pair of vario-couplers, reversible motors operatively connected with said vario-couplers respectively, split fields controlling said motors, grid-controlled tubes having filaments, grids and plates, each coil of the split motor-fields being connected in series with the plate of a respective tube, galvanometer relays controlling the flow of current through the tubes, and a commutator controlling the galvanometer relays.

3. The combination in an automatic compensator for a geophysical device, of a potentiometer comprising a pair of variocouplers, reversible motors operatively connected with said vario-couplers respectively, split fields controlling said motors, grid-controlled tubes having filaments, grids and plates, each coil of the split motor-fields being connected in series with the plate of a respective tube, means for maintaining a negative bias on the grid of each tube, and galvanometer relays controlling the flow current through one tube or the other of each motor.

4. The combination in an automatic compensator for a geophysical device, of a potentiometer comprising a pair of variocouplers, reversible motors operatively connected with said variocouplers respectively, split fields controlling said motors, grid-controlled tubes having filaments, grids and plates, each coil of the split motor-fields being connected in series with the plate of a respective tube, means for maintaining a negative bias on the grid of each tube, a double pole galvanometer relay for each motor, normally open circuits for the tubes respectively, the galvanometer relays being arranged to close the circuit of one tube or another of each of the motors, when fluctuating current to the galvanometer actuates some one way or the other.

5. The combination in an automatic compensator for a geophysical device, of a potentiometer comprising a pair of variocouplers that are out of phase with each other a predetermined amount, reversible motors connected with the variocouplers to balance the latter one with the other, split fields for the motors, grid-controlled tubes having filaments, grids and plates, each split portion of the motor-fields being connected in series with the plate of a respective tube, means for maintaining a negative bias on the grid of each tube, normally open circuits for supplying current to the filaments of the tubes respectively, a galvanometer relay arranged to close the circuit of one or the other tube of each motor, and a commutator electrically connected with the relays respectively, controlling the phase of current to the relays, relative to the variocouplers.

6. The combination in an automatic compensator for a geophysical device, of a potentiometer comprising a pair of variocouplers, reversible motors for adjusting the variocouplers relative to each other, the motors having means for operating a recording device, to provide a graphic record of the fluctuations of the variocouplers, split fields for the motors, grid-controlled tubes controlling the flow of current to the field portions respectively, the tubes having filaments, grids and plates, the plates being connected with the field portions respectively, means providing a negative bias on the grids, normally open circuits for the filaments, and a galvanometer relay for each motor, the relay being connected to close the circuit of one tube or another of each motor, depending upon the direction of current flow through the relay.

7. In an automatic compensator for a geophysical device, the combination of electrodes for suspending in a drill hole containing an electrically conductive liquid, a source of alternating current, insulated conductive means connecting said source with the electrodes, pick-up electrodes also to be suspended in said electrically conductive liquid, means comprising variocouplers for supplying opposing voltage to balance the potential between said pick-up electrodes, insulated conductive means connecting the variocouplers to said pick-up electrodes, means for indicating that the potential betwen the pick-up electrodes is balanced, reversible motors for automatically adjusting the variocouplers relative to each other, split fields for the motors, a pair of grid-controlled tubes having filaments, grids and plates, means providing a negative bias on the grids, the plates being connected with the split portions respectively of the motor fields, normally open circuits for the filaments and a galvanometer relay for each motor, the relay being connected to close the circuit of one tube or the other of the respective motor, and means synchronizing the operation of said source with the galvanometer relay.

8. In an automatic compensator for a geophysical device, the combination of means for generating an alternating electric field in a drill hole containing an electrically conductive liquid, and means for automatically compensating for changes in the phase and amplitude of said field at different points in said hole, comprising a potentiometer, split-field motors automatically controlling elements of the potentiometer, grid-controlled tubes controlling the split portions of the motor fields, relays controlling the flows of current that excite the motor fields, and means synchronizing the relays with said generating means.

9. In an automatic compensator of the character referred to in claim 8, in which the synchronizing means comprises a commutator operated by means actuated by the source of alternating current.

10. In an automatic compensator for a geophysical device, the combination of means for generating an alternating electric field in a drill hole containing an electrically conductive liquid, said means including a source of alternating current, electrodes suspended in said liquid and adapted to be moved to different points in said drill hole, and insulated conductive means connecting said source with said electrodes; and means for automatically compensating for changes in the phase and amplitude of the field at different points in said drill hole, comprising relay means synchronized with the source, grid-controlled tubes controlled by the relay means, and means actuated by current passing through the tubes for automatically adjusting the phase and amplitude of the field at different points in the drill hole.

11. In an automatic compensator for a geophysical device, the combination of means for generating an alternating electric field in a drill hole containing an electrically conductive liquid, and means for automatically compensating changes in the relative value of the phase and amplitude of said field at different points in said hole, comprising a potentiometer, having electrical balancing devices, reversible, direct current motors to automatically control the balancing devices, a source of direct current for the motors, grid-controlled tubes controlling the fields of the motors, and relays arranged to be actuated by a change of potential between the balancing devices, to control the flow of current through the tubes.

12. In an automatic compensator for a geophysical device, the combination of electrodes associated with a drill hole containing an electrically conductive liquid, the electrodes, the liquid and the surrounding strata being included in a circuit, a potentiometer connected with the electrodes, a variable resistance in the potentiometer, means connected with said resistance to re-balance the potentiometer circuit continually, said means including grid-controlled tubes comprising filaments, grids, and plates, the plates being connected to move the resistance in opposite directions to effect said balance, means providing a negative bias on the grids, normally open circuits for the filaments, and a galvanometer relay arranged to close the circuit of one filament or the other, the relay being connected with the well-and-strata circuit.

13. The combination with a geophysical apparatus having electrode means for sampling electric fields created within a bore hole, of an automatic compensator comprising: a potentiometer connected with said electrodes incorporating a balancing circuit, and an electrical balancing device therein; driving means for urging said balancing device in opposite directions; a pair of operating circuits controlling said driving means; an electronic valve in each operating circuit; and a dual control circuit incorporating said electronic valves and normally maintaining a bias thereon whereby both of said operating circuits are held open, said control circuit incorporating means electrically associated with said sampling means and responsive to fluctuations in said electric field, for removing the bias on either of said electronic valves and closing the corresponding operating circuit.

14. The combination in an automatic compensator for a geophysical device: of a potentiometer comprising a pair of balancing devices; drive means operatively connected with said balancing devices including electro-magnetic elements; grid-controlled tubes having filaments, grids and plates, each electro-magnetic element being connected in series with the plate of a respective tube; and relays controlling the flow of current through the tube.

15. An automatic compensator as set forth in claim 13 including: means for maintaining a negative bias on the grid of each tube whereby the circuit through the corresponding electro-magnetic element is normally open; and means for removing the negative bias on each of said tubes, said relays being positioned to control the last mentioned means.

16. The combination in an automatic compensator for a geophysical device: of a potentiometer comprising a pair of balancing devices; drive means for operating the balancing devices relative to each other, said drive means including electro-magnetic elements; a recording device operatively connected with said drive means to provide a graphic record of the fluctuations of the said balancing devices; grid-controlled tubes controlling the flow of current to the electro-magnetic devices, the tubes having filaments, grids and plates, the plates being connected with the electro-magnetic elements respectively; means providing a negative bias on the grids of said tubes; normally open circuits adapted when closed to remove the bias on said grids; and a relay for each drive means, the relay being connected to close the filament circuits of one tube or the other of each drive means, depending upon the direction of current flow through the relay.

MERLE C. BOWSKY.
ARTHUR B. WINTER.